United States Patent
Kunimatsu et al.

(10) Patent No.: US 9,285,636 B2
(45) Date of Patent: Mar. 15, 2016

(54) LIQUID CRYSTAL DISPLAY DEVICE

(75) Inventors: Noboru Kunimatsu, Chiba (JP); Chikae Matsui, Mobara (JP); Shigeru Matsuyama, Mobara (JP); Masaki Matsumori, Tokai (JP); Yasushi Tomioka, Hitachinaka (JP); Katsumi Kondo, Mito (JP)

(73) Assignees: Japan Display Inc., Tokyo (JP); Panasonic Liquid Crystal Display Co., Ltd., Himeji-shi (JP)

( * ) Notice: Subject to any disclaimer, the term of this patent is extended or adjusted under 35 U.S.C. 154(b) by 823 days.

(21) Appl. No.: 12/472,402

(22) Filed: May 27, 2009

(65) Prior Publication Data

US 2010/0060836 A1    Mar. 11, 2010

(30) Foreign Application Priority Data

May 27, 2008 (JP) .................... 2008-137967

(51) Int. Cl.
*C09K 19/00* (2006.01)
*G02F 1/1337* (2006.01)
*C08G 73/10* (2006.01)
(Continued)

(52) U.S. Cl.
CPC ...... *G02F 1/133723* (2013.01); *C08G 73/1078* (2013.01); *C08G 73/12* (2013.01); *C08L 77/06* (2013.01); *C08L 79/08* (2013.01); *C08L 79/085* (2013.01); *G02F 1/133788* (2013.01);
(Continued)

(58) Field of Classification Search
CPC .................. G02F 1/133723; G02F 1/133788; G02F 1/134363; G02F 2001/133397; C08G 73/1078; C08G 73/12; C08L 77/06; C08L 79/08; C08L 79/085; C09K 19/02; Y10T 428/10; Y10T 428/1005; Y10T 428/1018
USPC .......... 428/1.2, 1.25, 1.26, 1.3, 1.1; 349/123, 349/124, 129, 141; 427/162, 532, 553; 430/20; 522/134, 146; 528/310, 367
See application file for complete search history.

(56) References Cited

U.S. PATENT DOCUMENTS

| | | | |
|---|---|---|---|
| 2004/0165132 A1* | 8/2004 | Tomioka et al. | 349/123 |
| 2005/0001971 A1* | 1/2005 | Sato | 349/177 |
| 2005/0208231 A1* | 9/2005 | Nimura et al. | 428/1.3 |
| 2007/0007493 A1* | 1/2007 | Hattori et al. | 252/299.63 |
| 2007/0160778 A1* | 7/2007 | Matsumori et al. | 428/1.2 |

FOREIGN PATENT DOCUMENTS

| | | |
|---|---|---|
| JP | 09-073101 | 3/1997 |
| JP | 10-253963 | 9/1998 |

(Continued)

OTHER PUBLICATIONS

English translation of communication mailed Aug. 19, 2014, in connection with Japanese Patent Application No. 2013-220689, 4 pages.

*Primary Examiner* — Ruiyun Zhang
(74) *Attorney, Agent, or Firm* — TYPHA IP LLC (57) ABSTRACT

An image retention phenomenon and black unevenness generated after long-time operation in the liquid crystal device are prevented. By using a material having a polyamide acid ester as a precursor less likely to adsorb impurities on a boundary for an alignment film and a material having a dielectric constant anisotropy $\Delta\varepsilon$ of 5 or less for liquid crystals, adsorption of an antioxidant dispersed in the liquid crystals is suppressed to prevent oxidation of the liquid crystals. The extent that impurities are intruded into the liquid crystals is reduced by restricting the dielectric constant anisotropy $\Delta\varepsilon$ of the liquid crystals to 5 or less, thereby capable of preventing the image retention phenomenon and the black unevenness.

12 Claims, 8 Drawing Sheets

(51) Int. Cl.
*C08G 73/12* (2006.01)
*C08L 77/06* (2006.01)
*C08L 79/08* (2006.01)
*G02F 1/1343* (2006.01)
*G02F 1/1333* (2006.01)

(52) U.S. Cl.
CPC ............... *G02F1/134363* (2013.01); *G02F 2001/133397* (2013.01); *Y10T 428/1018* (2015.01)

(56) References Cited

FOREIGN PATENT DOCUMENTS

| JP | 11-218765 | 8/1999 |
| JP | 2000-180861 | 6/2000 |
| JP | 2002-040442 | 2/2002 |
| JP | 2003-005187 | 1/2003 |
| JP | 2003-026918 | 1/2003 |
| JP | 2008-003118 | 1/2008 |
| JP | 2008-111113 | 5/2008 |

\* cited by examiner

FIG.4A $\Delta \varepsilon \leqq 5$

FIG.4B $\Delta \varepsilon > 5$

LIQUID CRYSTAL DISPLAY DEVICE

CLAIM OF PRIORITY

The present application claims priority from Japanese Patent Application JP 2008-137967 filed on May 27, 2008, the content of which is hereby incorporated by reference into this application.

BACKGROUND OF THE INVENTION

1. Field of the Invention

The present invention concerns a display device and it relates to a liquid crystal display device with less image sticking during operation and not causing image defects such as black unevenness even after operation for a long time.

2. Description of Related Art

In a liquid crystal display device, a TFT substrate having pixel electrodes and thin film transistors (TFT) formed in a matrix and a counter substrate opposed to the TFT substrate and having color filters, etc, formed at portions corresponding to the pixel electrodes of the TFT substrate are disposed, and liquid crystals are put between the TFT substrate and the counter substrate. Then, images are formed by controlling the transmittance of a light by liquid crystal molecules on every pixel.

Since the liquid crystal display device is flat and light in weight, the application use thereof has been extended in various fields including large sized display devices such as TV, and cellular phones or DSC (digital still cameras). On the other hand, view angle characteristics become a problem in the liquid crystal display devices. The view angle characteristics concern a phenomenon that luminance or chromaticity changes between a case of observing a screen from the front and a case of observing the screen obliquely. For the view angle characteristics, an IPS (in plane switching) system of operating liquid crystal molecules by an electric field in a horizontal direction has excellent characteristics.

An example of such liquid crystal display devices of the IPS system is disclosed, for example, in Japanese Patent Laid Open No. Hei 09-73101.

The liquid crystal display device is used for a long time. When the liquid crystal display device is used for a long time, it sometimes causes image defects. The image defects can be classified into two types. The first defect is irreversible change of the displayed images after long-time use which includes, for example, those defects referred to as black unevenness in a normally black mode of displaying black in a state of not applying a voltage. The second type defect is a phenomenon that an image remains on a screen when it is displayed for a long time and this is referred to, for example, as DC image retention.

Figure 12:
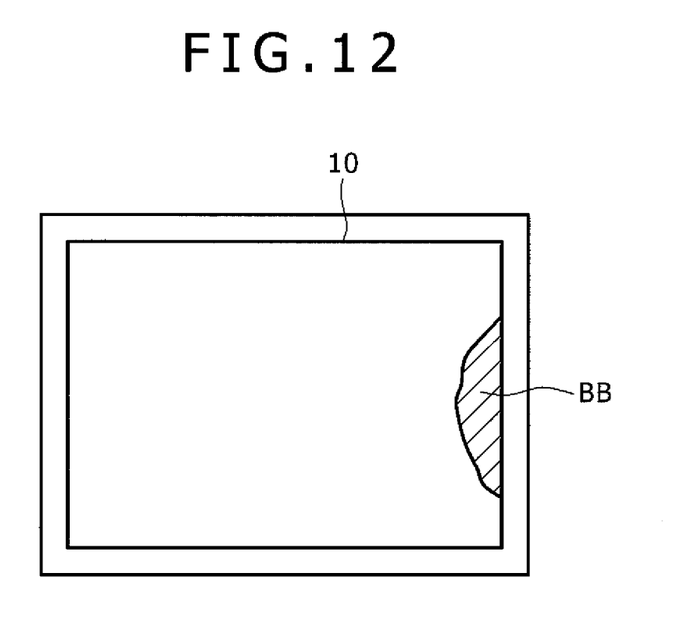
FIG. 12 shows an example of black unevenness.

An example of the black unevenness is shown in FIG. 12. In FIG. 12, the black unevenness is depicted as BB. Black variation is a phenomenon that a certain region on the screen is blackened more compared with other regions. The phenomenon may be caused when a liquid crystal display device is operated for a long time, for example, 1,000 hours or more. The phenomenon is considered to be attributable to contamination of liquid crystals with impurities which lowers the insulation resistance of liquid crystals by long-time operation of the liquid crystal display device.

Figure 10:
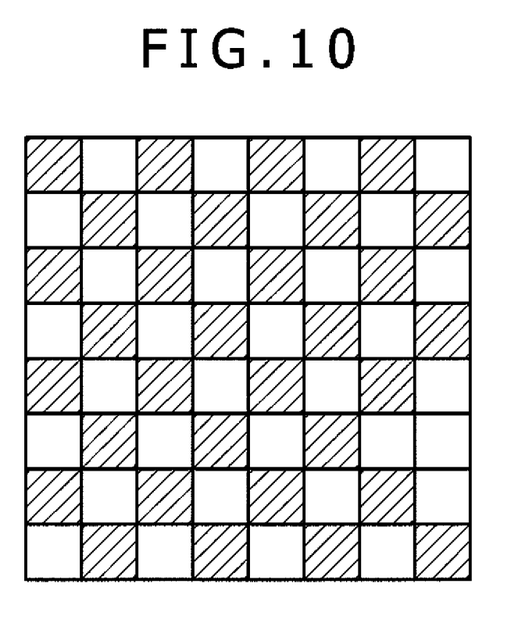
FIG. 10 shows a checker flag pattern used for the evaluation of image retention.

The DC image retention is a phenomenon that a pattern as shown in FIG. 10 remains sickly on the screen in a case where a halftone solid gray pattern is displayed after displaying a pattern as shown in FIG. 10 for a predetermined time. Such a phenomenon may be explained, for example, as that when impurities are deposited to alignment films that put liquid crystals therebetween, the impurities are charged by video signals and image retention remains when the charges are maintained for a predetermined time. Since the DC image retention disappears when the charges of the impurities on the alignment film are eliminated, this is a reversible phenomenon.

The present invention intends to eliminate the black unevenness and the DC image retention as described above.

SUMMARY OF THE INVENTION

In accordance with the present invention, the problems described above can be solved by the following specific liquid crystal display devices.

(1) A liquid crystal display device having a TFT substrate in which an alignment film is formed on a pixel having a pixel electrode and a TFT, a counter substrate opposed to the TFT substrate in which an alignment film is formed on a color filter, and liquid crystals put between the alignment film of the TFT substrate and the alignment film of the counter substrate, wherein the alignment film includes a polyamide acid ester having a structure of the chemical formula (1), the liquid crystals contain an antioxidant, and dielectric constant anisotropy of the liquid crystal is 5 or less:

[ka-1]

where $R_1$ represents each independently an alkyl group having 1 to 8 carbon atoms, $R_2$ represents each independently a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($-(CH_2)_m-CH=CH_2$, m=0, 1, 2) or an acetyl group ($-(CH_2)_m-C\equiv CH$, m=0, 1, 2), and Ar represents an aromatic compound.

(2) The liquid crystal display device according to (1) described above, wherein the alignment film includes the polyamide acid ester as a precursor.

(3) The liquid crystal display device according to (1) described above, wherein the device is a liquid crystal display device of an IPS system in which a common electrode opposed to the pixel electrode is formed to the TFT substrate.

(4) The liquid crystal display device according to (1) described above, wherein the alignment film is aligned by optical alignment.

(5) A liquid crystal display device including a TFT substrate having a first electrode formed in a planar shape, a second electrode disposed above the first electrode by way of an insulative film, and an alignment film formed above a pixel formed with a TFT, a counter substrate opposed to the TFT substrate in which an alignment film is formed on a color filter, and liquid crystals put between the alignment film of the TFT substrate and the alignment film of the counter substrate, wherein the alignment film includes a polyamide acid ester having the structure of the chemical formula (1), the liquid crystals contain an antioxidant, and dielectric constant anisotropy of the liquid crystal is 5 or less:

[ka-2]

(1)

where $R_1$ represents each independently an alkyl group having 1 to 8 carbon atoms, $R_2$ represents each independently a hydrogen atom, a fluorine atom, a chlorine atom, a bromine atom, a phenyl group, an alkyl group having 1 to 6 carbon atoms, an alkoxy group having 1 to 6 carbon atoms, a vinyl group (—$(CH_2)_m$—CH=$CH_2$, m=0, 1, 2) or an acetyl group (—$(CH_2)_m$—C≡CH, m=0, 1, 2), and Ar represents an aromatic compound.

(6) The liquid crystal display device according to (5) described above, wherein the alignment film includes the polyamide acid ester as a precursor.

(7) The liquid crystal display device according to (5) described above, wherein the alignment film is aligned by optical alignment.

(8) The liquid crystal display device according to (5) described above, wherein the first electrode is a common electrode and the second electrode is a pixel electrode formed in an interdigitated shape.

(9) The liquid crystal display device according to (5) described above, wherein the first electrode is a pixel electrode and the second electrode is a common electrode formed in an interdigitated shape.

According to the invention, since oxidation or decomposition of the liquid crystals is prevented, the presence of oxidation products or decomposition products of the liquid crystals as impurities in the liquid crystals can prevent lowering of the insulation resistance of the liquid crystals. Therefore, black unevenness generated by long-time operation of the liquid crystal display device can be prevented.

In the invention, since a material including the polyamide acid ester less likely to adsorb impurities on the boundary is used as the precursor for the alignment film, image retention due to the retention DC generated upon charging of the impurities at the boundary of the alignment film can be prevented.

In the invention, since liquid crystals having a specific dielectric constant $\Delta \in$ of 5 or less are used, impurities are less likely to intrude into the liquid crystals. Further, since the material including the polyamide acid ester alignment film as the precursor is used, the impurities are less likely to be absorbed to the boundary of the alignment film. Accordingly, image retention due to the retention DC and the black unevenness caused after long-time operation of the liquid crystal display device can be prevented.

PREFERRED EMBODIMENTS OF THE INVENTION

The present invention is to be described specifically by way of the following embodiments.

Embodiment 1

Figure 1:
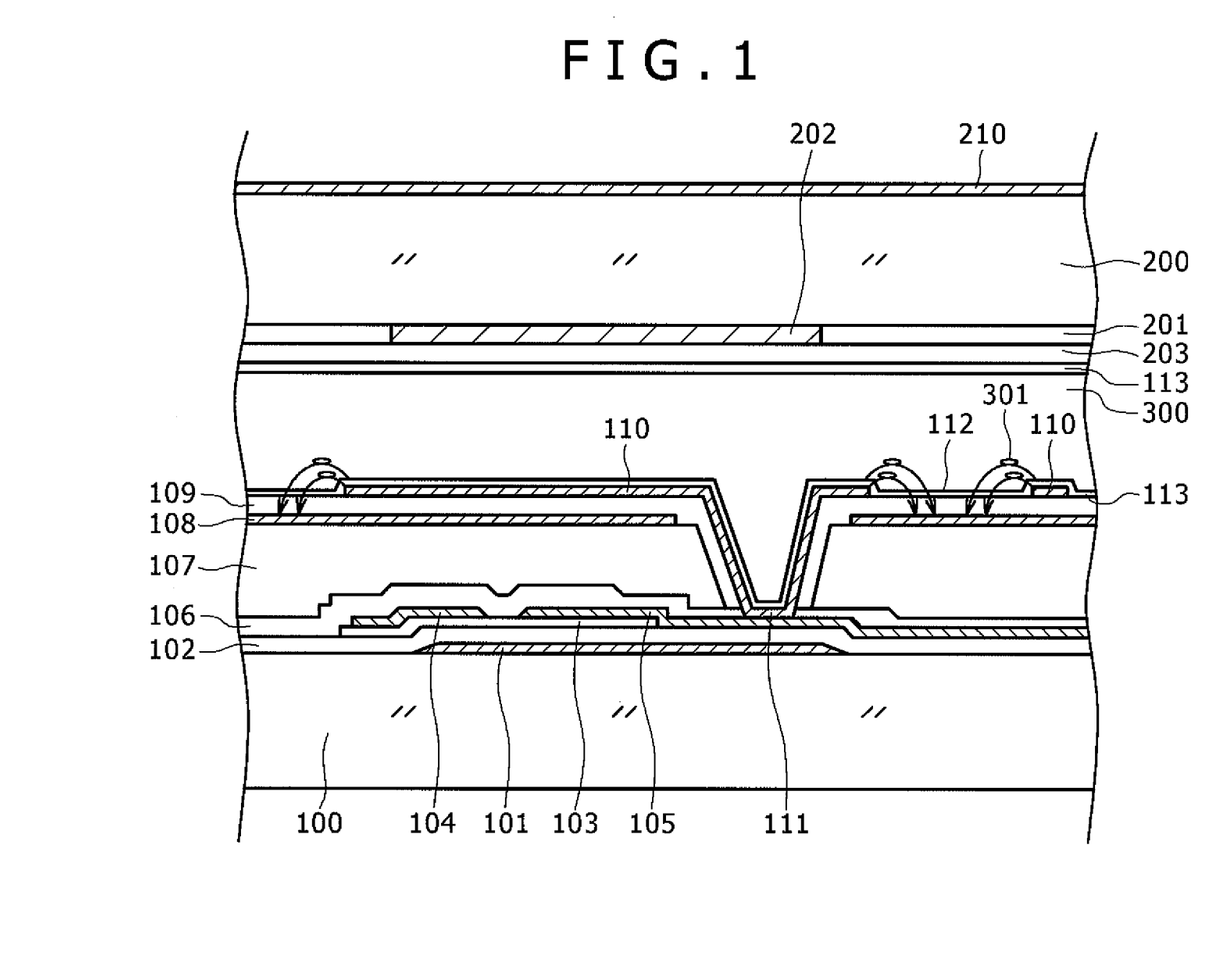
FIG. 1 is a cross sectional view of a liquid crystal display device of an IPS system.

FIG. 1 is a cross sectional view showing the structure in a display region of a liquid crystal display device. Various electrode structures for the liquid crystal display devices of an IPS system have been proposed and put to practical use. The structure shown in FIG. 1 is used generally at present and, referring to the structure briefly, an interdigitated pixel electrode 110 is formed above a common electrode 108 which is formed in a planar solid state with an insulative film being put between them. Then, images are formed by controlling the transmittance of a light in a liquid crystal layer 300 on every pixel by rotating liquid crystal molecules 301 by a voltage between the pixel electrode 110 and the common electrode 108. The structure shown in FIG. 1 is to be described specifically. While the invention is to be described with reference to the constitution of FIG. 1 as an example, the invention is also applicable to other liquid crystal display devices of the IPS type than that shown in FIG. 1.

In FIG. 1, a gate electrode 101 is formed above a TFT substrate 100 formed of glass. The gate electrode 101 is formed coplanar with scanning lines. In the gate electrode 101, an MoCr alloy is stacked above an AlNd alloy.

A gate insulator 102 is formed of SiN while covering the gate electrode 101. A semiconductor layer 103 is formed of an a-Si film above the gate insulator 102 at a position opposing to the gate electrode 101. The a-Si film is formed by plasma CVD. The a-Si film forms a channel portion of the TFT, and a source electrode 104 and a drain electrode 105 are formed above the a-Si film while putting the channel portion therebetween. An unillustrated n+Si layer is formed between the a-Si film and the source electrode 104 or the drain electrode 105 for establishing an ohmic contact between the semiconductor layer 103 and the source electrode 104 or the drain electrode 105.

The source electrode 104 also serves as video signal lines 40 and the drain electrode 105 is connected with a pixel electrode 110. The source electrode 104 and the drain electrode 105 are formed simultaneously as a coplanar layer. In this embodiment, the source electrode 104 and the drain electrode 105 are formed of an MoCr alloy. When it is intended to lower the electric resistance of the source electrode 104 or the drain electrode 105, an electrode structure, for example, including an AlNd alloy sandwiched between MoCr alloys is used.

An inorganic passivation film 106 is formed of SiN while covering the TFT. The inorganic passivation film 106 protects the TFT, particularly, the channel portion thereof from impurities 401. An organic passivation film 107 is formed above the inorganic passivation film 106. Since the organic passivation film 107 also has a role of planarizing the surface together with protection of the TFT, it is formed at an increased thickness. The thickness is from 1 µm to 4 µm.

For the organic passivation film 107, a photosensitive acrylic resin, a silicon resin, a polyimide resin, or the like is used. It is necessary for the organic passivation film 107 that a through hole 111 is formed at a portion where the pixel electrode 110 and the drain electrode 105 are connected. Since the organic passivation film 107 is photosensitive, the through hole 111 can be formed by performing exposure and development to the organic passivation film 107 per se without using a photoresist.

A common electrode 108 is formed above the organic passivation film 107. The common electrode 108 is formed by sputtering ITO (indium tin oxide) as a transparent conductive film over the entire display region. That is, the common electrode 108 is formed in a planar shape. After forming the common electrode 108 by sputtering over the entire surface, only the portion for the through hole 111 for conducting the pixel electrode 110 and the drain electrode 105 is removed by etching the common electrode 108.

An upper insulative film 109 is formed of SiN while covering the common electrode 108. After forming the upper electrode, the through hole 111 is formed by etching. The through hole 111 is formed by etching the inorganic passivation film 106 using the upper insulative film 109 as a resist. Then, ITO as the pixel electrode 110 is formed by sputtering while covering the upper insulative film 109 and the through hole 111. The pixel electrode 110 is formed by patterning the sputtered ITO. The ITO as the pixel electrode 110 is deposited also in the through hole 111. In the through hole 111, the drain electrode 105 extended from the TFT and the pixel electrode 110 are conducted, through which video signals are supplied to the pixel electrode 110.

Figure 2:
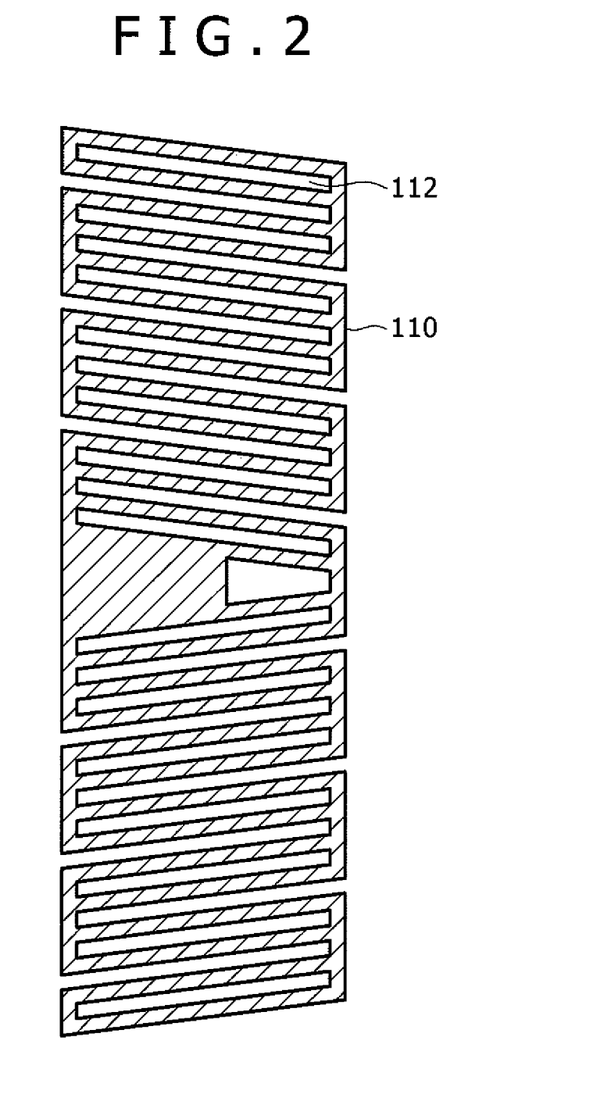
FIG. 2 is a plan view of a pixel electrode in FIG. 1.

FIG. 2 shows an example of the pixel electrode 110. The pixel electrode 110 is an interdigitated electrode closed on both ends. A slit 112 is formed between digits. Below the pixel electrode 110, the planar common electrode 108 is formed (not illustrated). When the video signals are supplied to the pixel electrode 110, liquid crystal molecules 301 are rotated by lines of electric force generated between the common electrode 108 and the pixel electrode 110 through the slit 112. This controls a light passing through the liquid crystal layer 300 to form images.

FIG. 1 explains the state described above in the cross sectional view. The slit 112 is defined between adjacent interdigitated electrodes. A reference voltage is applied to the common electrode 108 and a voltage by the video signal is applied to the pixel electrode 110. When the voltage is applied to the pixel electrode 110, as shown in FIG. 1, lines of electric force are generated to rotate the liquid crystal molecules 301 in the direction of the lines of electric force thereby controlling the transmittance of a light from a back light. Since the transmittance from the back light is controlled on every pixel, images are formed. An alignment film 113 is formed above the pixel electrode 110 for aligning the liquid crystal molecules 301.

In the example of FIG. 1, the common electrode 108 formed in a planar shape is disposed above the organic passivation film 107 and the interdigitated electrode 110 is disposed above the upper insulative film 109. On the contrary, a pixel electrode 110 formed in a planar shape may be disposed above the organic passivation film 107 and the interdigitated common electrode 108 may be disposed above the insulation film 109.

In FIG. 1, a counter substrate 200 is disposed while sandwiching a liquid crystal layer 300. A color filter 201 is formed on the inside of the counter substrate 200. In the color filter 201, red, green, and blue color filters 201 are formed on every pixel to form color images. A black matrix 202 is formed between the color filters 201, 201 adjacent with each other to improve the contrast of images. The black matrix 202 also has a role as a light shield film for the TFT and prevents flowing of a photo-current to the TFT.

An overcoat film 203 is formed while covering the color filter 201 and the black matrix 202. Since the surface of the color filter 201 and the black matrix 202 is uneven, the surface is planarized by the overcoat film 203. An alignment film 113 for determining the initial alignment of liquid crystals is formed on the overcoat film 203. Since FIG. 2 shows the IPS system, the common electrode 108 is formed on the side of the TFT substrate 100 and not formed on the side of the common electrode 200.

As shown in FIG. 1, a conductive film is not formed to the inside of the counter substrate 200 in the IPS system. Then, the potential of the counter substrate 200 becomes instable. Further, electromagnetic noises from the outside intrude into the liquid crystal layer 300 to give undesired effects on the images. In order to eliminate such a problem, a surface conductive film 210 is formed to the outside of the counter substrate 200. The surface conductive film 210 is formed by sputtering ITO as a transparent conductive film.

When the liquid crystals of the liquid crystal layer 300 shown in FIG. 1 are oxidized or decomposed, the display characteristics of the liquid crystal display device are deteriorated. This remarkably occurs particularly due to the presence of light or heat. Accordingly, an antioxidant 400 is mixed in the liquid crystal layer 300 to prevent the oxidation of the liquid crystals. The antioxidant incorporated in the liquid crystal material includes, for example, phenol, phosphate, phosphite, or sulfur type materials. The effect can be obtained by incorporating such a material within a range from 0.0005 to 10 wt %. For obtaining a higher effect, the content is within a range preferably from 0.001 to 5 wt % but the material and the range described above are not limitative.

As shown in FIG. 1, the liquid crystal layer 300 is put between the alignment films 113. A material having a polyamide acid 1132 as a precursor has conventionally been used as the material of the alignment film 113. The polyamide acid 1132 is partially formed into a polyamide and another portion remains as an unreacted polyamide acid 1132 by heating at about 200° C. which is referred to as imidation baking. However, the residual polyamide acid 1132 has a high polarity in view of the property of the material and tends to adsorb the antioxidant 400 as will be described later.

When the antioxidant 400 is adsorbed to the alignment film 113, the antioxidant 400 in the liquid crystal layer 300 is decreased. Then, the liquid crystals are liable to be oxidized or decomposed under the presence of light or heat to generate impurities 401. When the impurities 401 are present in the liquid crystal layer 300, they lower the insulation resistance of the liquid crystal layer 300 to deteriorate the voltage holding characteristics. When the impurities are adsorbed to the alignment films 113, they are charged up to cause DC image retention during operation of the liquid crystal display device.

Figure 3A:
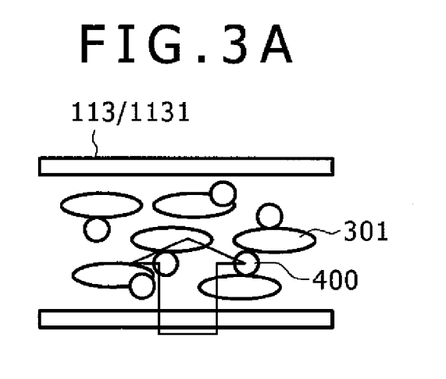
FIG. 3A is a schematic view showing an embodiment of the invention for comparison with an existent embodiment.
Figure 3B:
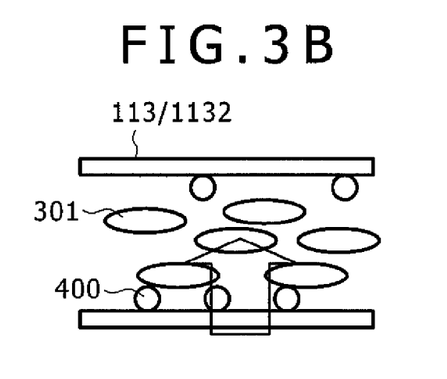
FIG. 3B is a schematic view showing the existent embodiment for comparison with the embodiment of the invention.

In the invention, adsorption of the antioxidant 400 to the alignment films 113 is prevented by using a material having the polyamide acid ester 1131 as a precursor for the alignment film 113. FIGS. 3A and 3B show such situations. FIG. 3A is a schematic cross sectional view showing the constitution for an embodiment of the invention and FIG. 3B is a schematic cross sectional view showing the constitution for an existent embodiment. In FIG. 3A and FIG. 3B, a detailed structure for the liquid crystal display device shown in FIG. 1 is not shown. Further, blank arrows in FIG. 3A and FIG. 3B show a light from a backlight that promotes oxidation or decomposition of liquid crystals.

In FIG. 3A, a material having the polyamide acid ester 1131 as the precursor is used for the alignment film 113. Like the polyamide acid, the polyamide acid ester 1131 is also transformed partially into a polyamide and partially remains as an unreacted polyamide acid ester 1131 by imidation baking. However, the remaining polyamide acid ester 1131 has a lower polarity and is less likely to adsorb the antioxidant 400 in view of the property of the material compared with the polyamide acid 1132 as will be described later. Accordingly, since a sufficient amount of the antioxidant 400 is present in the liquid crystal layer 300, oxidation of the liquid crystal molecules 301 can be prevented. On the other hand, in the existent example, since the material having the polyamide acid 1132 as the precursor is used for the alignment film 113, this tends to adsorb the antioxidant 400. Then, the amount of the antioxidant 400 in the liquid crystal layer 300 is decreased relatively, so that the liquid crystals are oxidized or decomposed to bring about a problem such as black unevenness or DC image retention.

Chemical formula (1) is a structural formula for the polyamide acid ester 1131 used in FIG. 3A.

[ka-3]

(1)

where $R_1$ represents each independently an alkyl group having 1 to 8 carbon atoms, $R_2$ represents each independently a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($-(CH_2)_m-CH=CH_2$, m=0, 1, 2) or an acetyl group ($-(CH_2)_m-C\equiv CH$, m=0, 1, 2), and Ar represents an aromatic compound.

The characteristic feature of the polyamide acid ester 1131 resides in $R_1$ in the chemical formula (1). In the polyamide acid ester 1131, $R_1$ is $C_nH_{2n-1}$ in which n is 1 or more. In the polyamide acid 1132 used in the existent alignment film 113 shown in FIG. 3B, n=0 and only hydrogen is present at the position for $R_1$ in the chemical formula (1). Hydrogen is partially ionized as a hydrogen ion while the extent of ionization is different depending on the amount of water present at the periphery thereof, and the species and the amount of the compound. The polyamide acid 1132 after ionization of the hydrogen ions is transformed into carboxylic acid ions having a negative charge. Then, they tend to adsorb the antioxidant 400 and the various impurities 401 in the liquid crystal layer 300. On the contrary, in the invention, adsorption of the antioxidant 400 to the alignment film 113 is prevented by using the polyamide acid ester 1131 from which the hydrogen ions are not ionized as the material for the alignment film 113.

On the other hand, the various impurities 401 are intruded in addition to the antioxidant in the liquid crystal layer 300. Some of the impurities 401 are present in the liquid crystals before sealing in the liquid crystal display panel, and others are intruded from various kinds of materials forming the structure in the liquid crystal display panel after injection of the liquid crystals. When the specific dielectric constant of the liquid crystal is high, such impurities 401 tend to be intruded in the liquid crystals. On the contrary, when the specific dielectric constant of the liquid crystal is low, such impurities 401 are less likely to be incorporated.

Figure 4A:
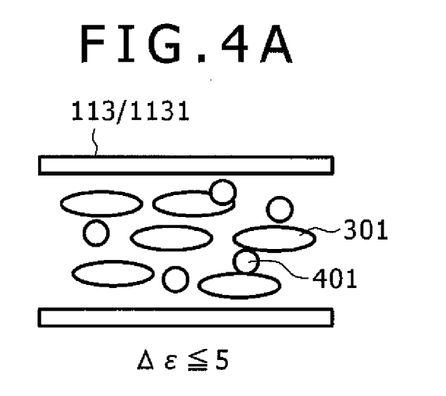
FIG. 4A is a schematic view showing another embodiment of the invention for comparison with another existent embodiment.
Figure 4B:
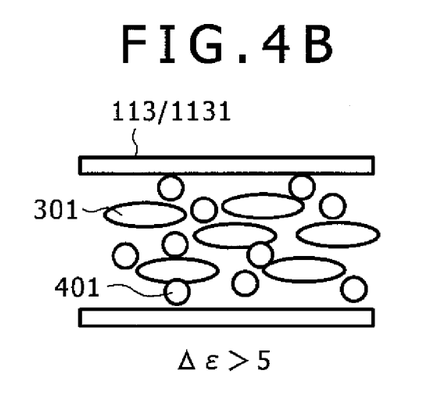
FIG. 4B is a schematic view showing another existent embodiment for comparison with another embodiment of the invention.

When such impurities 401 are contained in the liquid crystal layer 300, they cause black unevenness, DC image retention, etc. In the invention, the dielectric constant anisotropy of liquid crystals is taken up as a parameter having a high correlation with the specific dielectric constant of the liquid crystals, and the black unevenness, DC image retention, etc. are suppressed by using a material having the dielectric constant anisotropy of 5 or less, thereby decreasing the amount of the impurities 401 intruded into the liquid crystals. FIGS. 4A and 4B show the state described above. FIG. 4A shows a case where the dielectric constant anisotropy of the liquid crystals is 5 or less as in the invention and FIG. 4B shows a case where the dielectric constant anisotropy of the liquid crystal is 5 or more. FIGS. 4A and 4B show that more impurities 401 are contained in the liquid crystal layer 300 when the dielectric constant anisotropy of the liquid crystals is higher even when an identical alignment film material is used.

Figure 5A:
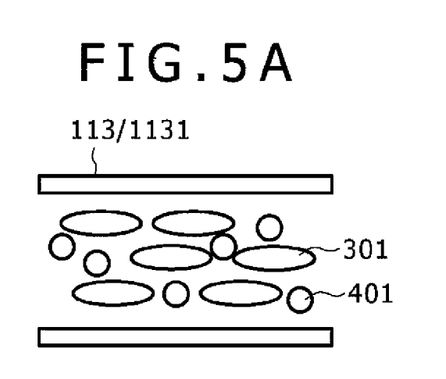
FIG. 5A is a schematic view showing a further embodiment of the invention for comparison with a further existent embodiment.
Figure 5B:
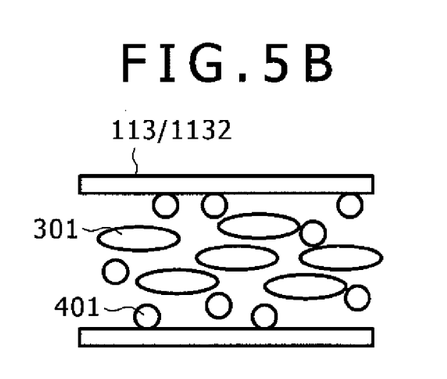
FIG. 5B is a schematic view showing the further existent embodiment for comparison with the further embodiment of the invention.

For reducing the black unevenness and the DC image retention, it is necessary not only to decrease the oxidation products or decomposition products of the liquid crystals by preventing oxidation or decomposition of the liquid crystals but also to decrease the impurities 401 intruded into the liquid crystals. In the invention, the black unevenness and the DC image retention are reduced by using both of the means. FIGS. 5A and 5B are schematic cross sectional views showing the state described above.

FIG. 5A is a schematic cross sectional view showing the constitution of the invention. In FIG. 5A, a material having the polyamide acid ester 1131 as a precursor is used for the material of the alignment film. Further, a material having the dielectric constant anisotropy of 5 or less is used for the liquid crystal material. On the other hand, FIG. 5B is a schematic cross sectional view showing the constitution of an existent example. In FIG. 5B, a material having the polyamide acid 1132 as a precursor is used as the alignment film 113. Further, a material having a dielectric constant anisotropy of 5 or more is used for the liquid crystals.

In the existent example shown in FIG. 5B, more of the impurities 401 are put between the alignment films 113, in which the impurities 401 are also present in the liquid crystal layer 300 and are also adsorbed to the alignment film 113. On the other hand, in the present invention shown in FIG. 5A, the impurities 401 are not adsorbed to the alignment film 113 and less of the impurities 401 are present in the liquid crystal layer 300 compared with the existent example. Accordingly, in FIG. 5A showing the constitution of the invention, both the black unevenness attributable to the impurities 401 in the liquid crystals and the DC image retention attributable to the impurities 401 at the boundary of the alignment film 113 can be reduced.

Figure 6:
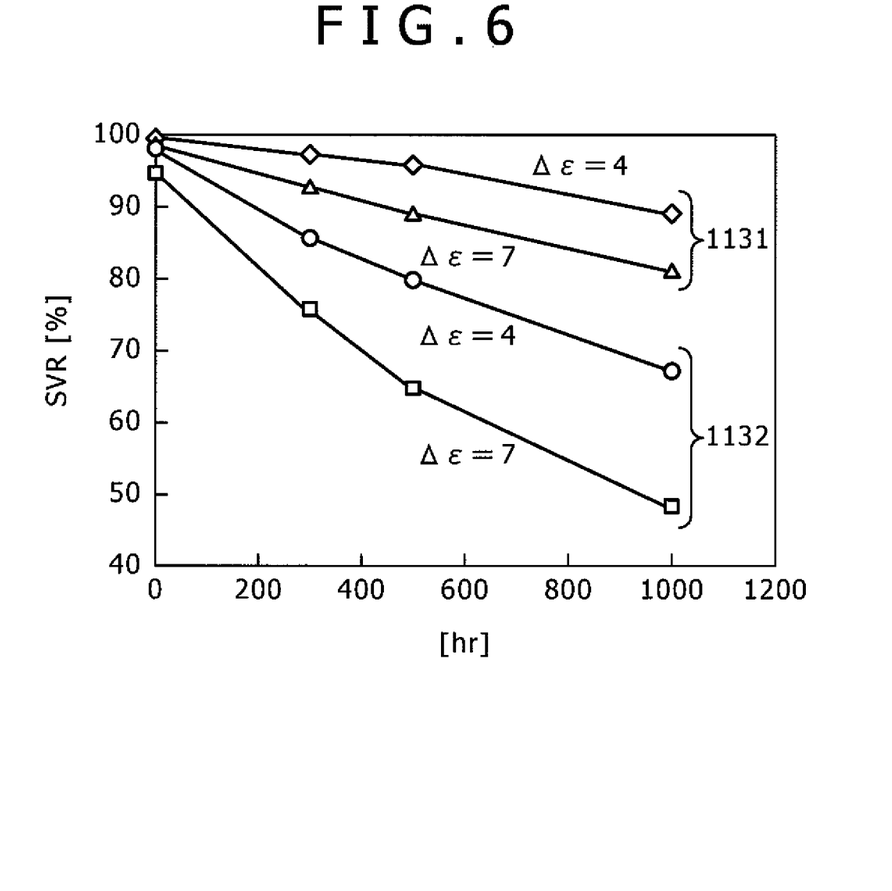
FIG. 6 is a graph for comparing characteristics between the embodiment of the invention and existent examples.

FIG. 6 is a graph showing the result of evaluation concerned with generation of the black unevenness after operating a liquid crystal display device for a long time. In FIG. 6, the ordinate represents a voltage holding ratio SVR and the abscissa represents a lighting time of a backlight. FIG. 6 shows the result of an experiment of setting a specimen shown in FIG. 7 on plural backlights and measuring the voltage holding ratio SVR per hour. The voltage holding ratio SVR provides a marker for the deterioration of liquid crystals.

Figure 7:
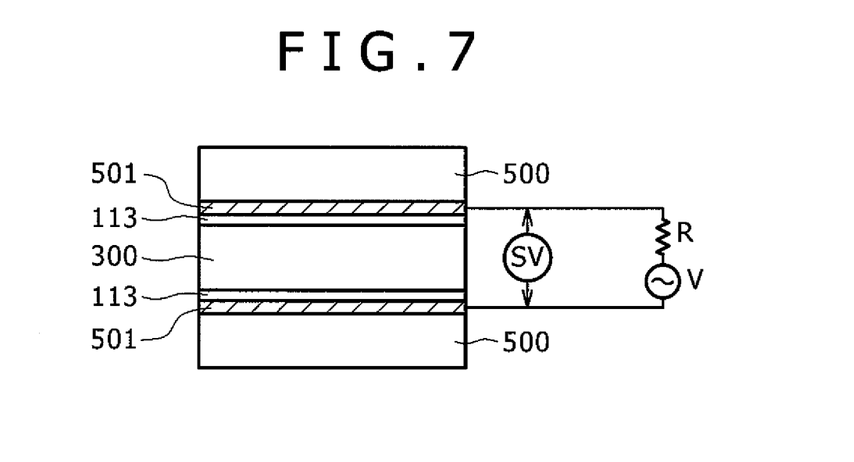
FIG. 7 shows a method of measuring a voltage holding ratio.

FIG. 7 shows the outline for the method of measuring the voltage holding ratio SVR. In FIG. 7, conductive films 51 as electrodes are formed at the inside of two sheets of glass substrates 500. An alignment film 113 is formed on the conductive film 501. An AC pulse voltage is applied to the conductive films 501 while putting the liquid crystal layer 300 therebetween. The liquid crystal molecules 301 are rotated by the AC pulse voltage. The voltage between the terminals of the conductive films 501 of the specimen is a holding voltage SV. When the insulation resistance of the liquid crystals lowers, the holding voltage SV between the conductive film terminals is lowered. This is because an internal resistance R is present in the power source. When the liquid crystals are deteriorated by oxidation or the like by being operated for a long time or exposed to the backlight for a long time, the insulation resistance of the liquid crystals lowers. Then, the holding voltage SV is lowered. The voltage holding ratio SVR is represented as a ratio for the decrement of the holding voltage SV. Then, the extent of deterioration of the liquid crystals can be evaluated by measuring the voltage holding ratio SVR per operation time.

In FIG. 6, plural samples of different specifications are placed on the backlight of the liquid crystals and the backlight is lit as in a usual liquid crystal display device. The voltage holding ratio SVR is measured on every lighting time. It can be said that the black unevenness is less likely to be caused in an actual liquid crystal display device as the lowering of the voltage holding ratio SVR is smaller. In FIG. 6, comparison is for the alignment film 113 made between a case of using materials having the polyamide acid ester 1131 as the precursor and the case of using materials having the polyamide acid 1132 as the precursor. Comparison is made for the dielectric constant anisotropy $\Delta\varepsilon$ of the liquid crystals between the case where $\Delta\varepsilon$ is 4 and the case where $\Delta\varepsilon$ is 7.

In FIG. 6, those using materials having the polyamide acid ester 1131 as the precursor for the alignment film 113 show better life time characteristics of the voltage holding ratio compared with those using materials having the polyamide acid 1132 as the precursor. Further, the voltage holding ratio is better in the case where $\Delta\varepsilon$ is 4 than in the case where $\Delta\varepsilon$ is 7. As shown in FIG. 6, in a case of using the materials having the polyamide acid ester 1131 as the precursor for the alignment film 113 and using the materials having the dielectric constant anisotropy at $\Delta\varepsilon=4$ which is smaller than 5 for the liquid crystals as the constitution of the invention, the life time characteristics of the voltage holding ratio are excellent compared with the case of other specifications. Accordingly, the black unevenness is less likely to be generated in the invention even after the long-time operation.

Figure 8:
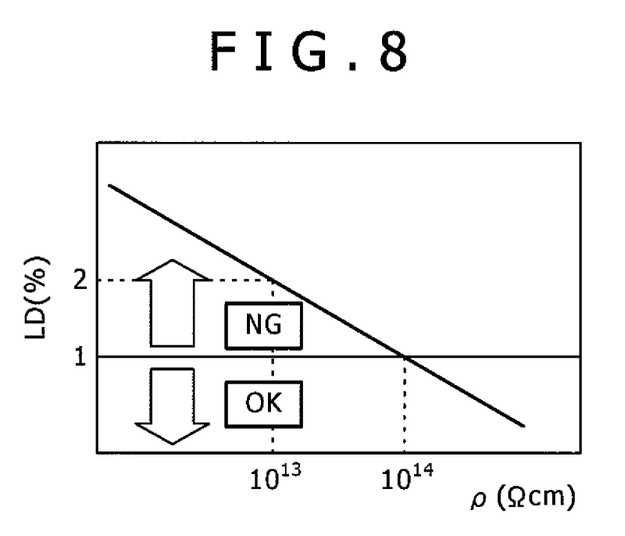
FIG. 8 shows a relation between a retention DC and a specific resistivity of liquid crystals.

FIG. 8 shows the result of evaluation as to whether or not the DC image retention is generated depending on the specific resistivity of the liquid crystals in a case of using materials having the polyamide acid ester 1131 as the precursor for the alignment film 113.

DC image retention was evaluated as described below. That is, a black and white 8×8 checker flag pattern as shown in FIG. 10 was displayed for 12 hours. Then, it was returned to a solid gray half tone. Gradation for the half tone was 64/256. The intensity of the DC image retention was evaluated by measuring the difference between the luminance at a portion which was displayed black and the luminance at a portion which was displayed white in the checker flag pattern just after returning to the half tone. In FIG. 8, the abscissa $\rho$ represents the specific resistivity of the liquid crystals, and the ordinate LD represents the rate of change of the luminance by percentage. As can be seen from FIG. 8, the difference of luminance, that is, the intensity of the DC image retention had a correlation with the specific resistivity of the liquid crystals. In the actual judgment of the image retention, it is judged as "NG" when the checker flag pattern can be recognized and judged as "OK" when it can not be recognized 10 minutes after returning to the solid gray half tone.

Figure 9:
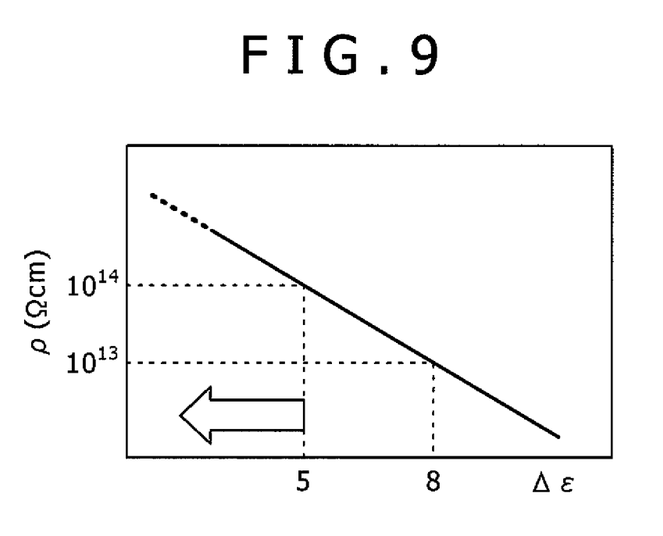
FIG. 9 shows a relation between a specific dielectric constant and a specific resistivity of liquid crystals.

As shown in FIG. 8, it can be seen that the DC image retention is "OK" when the specific resistivity $\rho$ of the liquid crystals is $10^{14}$ or higher. On the other hand, as shown in FIG. 9, the specific resistivity $\rho$ of the liquid crystals changes depending on the dielectric constant anisotropy of the liquid crystals. When the dielectric constant anisotropy $\Delta\varepsilon$ of the liquid crystals is 5 or less, the specific resistivity $\rho$ of the liquid crystals can be increased to $10^{14}$ or more. When the dielectric constant anisotropy of the liquid crystals is small, the impurities 401 that are intruded into the liquid crystals can be decreased. Further, by using the material having the polyamide acid ester 1131 as the precursor for the alignment film 113, the extent where the impurities 401 are adsorbed to the alignment film 113 is reduced. Accordingly, the amount of the impurities 401 adsorbed to the alignment film 113 is decreased, or the image retention DC can be suppressed.

As has been described above, according to the invention, the black unevenness which is an irreversible phenomenon and the image retention DC which is a reversible phenomenon causing the image retention generated after long-time operation can be reduced and a liquid crystal display device of excellent life time characteristics can be attained.

Embodiment 2

Generally, in the IPS system, unlike the vertical alignment system typically represented by existent TN systems, tilting at the boundary with the substrate surface is not necessary in principle and the view angle characteristics are improved more as the tilt angle at the boundary is smaller. Since the color change and the lightness change depending on the view angle of the liquid crystal display device can be decreased to less than allowable limits by decreasing the tilt angle to 1° or less, this is particularly effective. Accordingly, optical alignment capable of decreasing the tilt angle at the boundary substantially to 0° is an effective process in the IPS system.

Figure 11A:
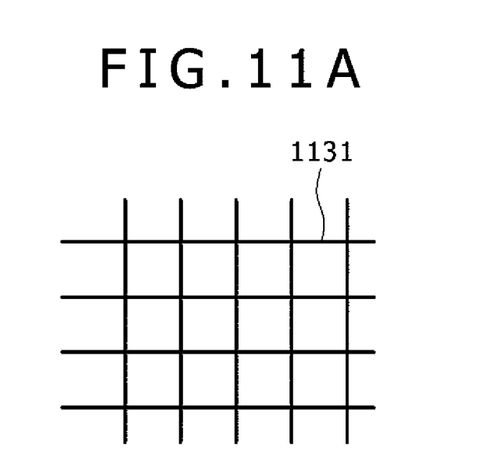
FIG. 11A is a schematic view showing the principle of optical alignment.

The material having the polyamide acid ester 1131 as the precursor explained for the Embodiment 1 is suitable as the alignment film 113 for optical alignment. The polyimide obtained by imidation baking has a network structure generally as shown in FIG. 11A in a state when it is formed into a film. A polarized UV-ray is irradiated to such a film at an energy, for example, of 6 J/cm². Then, the structure in the polyimide in the polarization direction of the polarized UV-ray is decomposed by the UV-ray as shown in FIG. 11B.

Figure 11B:
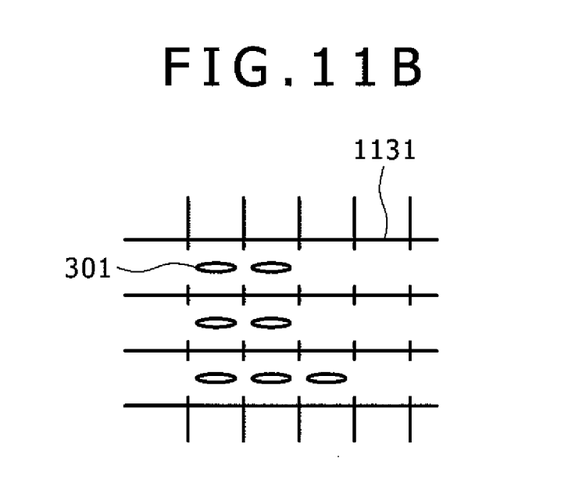
FIG. 11B is another schematic view showing the principle of optical alignment.

When a liquid crystal display device is manufactured by using the alignment film 113 formed as described above, the liquid crystal molecules 301 are aligned in a direction perpendicular to the polarization direction of the polarized UV-ray as shown in FIG. 11B. One of the problems in the optical alignment is that the portion of the alignment film 113 decomposed by the UV-ray has a polarity and may possibly be intruded as the impurities 401 into the liquid crystal display device.

Such a problem can be mitigated by using the material having the polyamide acid ester 1131 as the precursor for the alignment film 113 as in the invention. That is, since the polyamide acid ester 1131 remaining after the imidation baking has less polarity as the nature of the material as explained in the Embodiment 1, it is less likely to adsorb the decomposition products of the alignment film 113 and, accordingly, less likely to allow them to introduce to the inside of the liquid crystal display device.

Further, by lowering the dielectric constant anisotropy $\Delta\in$ of the liquid crystals to 5 or less as in the invention, the possibility of intruding the decomposition products of the alignment film into the liquid crystal can be reduced. Accordingly, the phenomenon of causing the black unevenness due to the effect of the impurities 401 in the liquid crystal layer 300 can also be reduced.

As has been described above, a liquid crystal display device of excellent life time characteristics using optical alignment can be attained by using the material having the polyamide acid ester 1131 as the precursor for the alignment film 113 and using the material having the dielectric constant anisotropy $\Delta\in$ of 5 or less for the liquid crystals.

While descriptions have been made to the liquid crystal display device of the IPS system in the embodiments described above, the invention is not restricted only to the application for the IPS system but is applicable also to liquid crystal display devices of a TN (twisted nematic) system or a VA (vertical alignment) system.

What is claimed is:

1. A liquid crystal display device comprising a TFT substrate in which an alignment film is formed on a pixel comprising a pixel electrode, a common electrode and a TFT, a counter substrate opposed to the TFT substrate in which an alignment film is formed on a color filter, and liquid crystals put between the alignment film of the TFT substrate and the alignment film of the counter substrate,
   wherein the alignment film of the TFT substrate is formed directly either on the pixel electrode or on the common electrode,
   wherein an alignment film of the TFT substrate and the alignment film of the counter substrate includes a polyamide acid ester having a structure of the chemical formula (1), the liquid crystals contain an antioxidant within a range from 0.0005 to 10 wt %, and a dielectric constant anisotropy of the liquid crystals is positive and is 5 or less,
   wherein a specific resistivity of the liquid crystals is $10^{14}$ $\Omega$cm or higher,
   wherein the alignment film of the TFT substrate and the alignment film of the counter substrate includes the polyamide acid ester as a precursor,
   wherein the device is a liquid crystal display device of an IPS system in which a common electrode opposed to the pixel electrode is formed to the TFT substrate,
   wherein black unevenness attributable to impurities in the liquid crystal and DC image retention attributable to impurities at the boundary of the alignment film are reduced,
   wherein the alignment film of the TFT substrate and the alignment film of the counter substrate is aligned by optical alignment:

where $R_1$ represents each independently an alkyl group having 1 to 8 carbon atoms, $R_2$ represents each independently a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($-(CH_2)_m-CH=CH_2$, m=0, 1, 2) or an acetyl group ($-(CH_2)_m-C\equiv CH$, m=0, 1, 2) and Ar represents an aromatic compound.

2. A liquid crystal display device including a TFT substrate comprising a first electrode formed in a planar shape, a second electrode disposed above the first electrode by way of an insulative film, and an alignment film formed above a pixel formed with a TFT, a counter substrate opposed to the TFT substrate in which an alignment film is formed on a color filter, and liquid crystals put between the alignment film of the TFT substrate and the alignment film of the counter substrate,
   wherein the alignment film of the TFT substrate is formed directly on the second electrode,
   wherein an alignment film of the TFT substrate and the alignment film of the counter substrate includes a polyamide acid ester having a structure of the chemical formula (1), the liquid crystals contain an antioxidant within a range from 0.0005 to 10 wt %, and a dielectric constant anisotropy of the liquid crystals is positive and is 5 or less, wherein a specific resistivity of the liquid crystals is $10^{14}$ $\Omega$cm or higher,
   wherein the alignment film of the TFT substrate and the alignment film of the counter substrate includes the polyamide acid ester as a precursor,
   wherein black unevenness attributable to impurities in the liquid crystal and DC image retention attributable to impurities at the boundary of the alignment film are reduced,
   wherein the alignment film of the TFT substrate and the alignment film of the counter substrate is aligned by optical alignment:

where R1 represents each independently an alkyl group having 1 to 8 carbon atoms, R2 represents each independently a hydrogen atom, a fluorine atom, a chlorine atom, a bromine atom, a phenyl group, an alkyl group having 1 to 6 carbon atoms, an alkoxy group having 1 to 6 carbon atoms, a vinyl group ($-(CH_2)_m-CH=CH_2$, m=0, 1, 2) or an acetyl group ($-(CH_2)_m-C\equiv CH$, m=0, 1, 2), and Ar represents an aromatic compound.

3. The liquid crystal display device according to claim 2, wherein the first electrode is a common electrode and the second electrode is a pixel electrode formed in an interdigitated shape.

4. The liquid crystal display device according to claim 2, wherein the first electrode is a pixel electrode and the second electrode is a common electrode formed in an interdigitated shape.

5. The liquid crystal display device according to claim 1, wherein the liquid crystals contain the antioxidant within a range from 0.001 to 5 wt %.

6. The liquid crystal display device according to claim 2, wherein the liquid crystals contain the antioxidant within a range from 0.001 to 5 wt %.

7. The liquid crystal display device according to claim 1, wherein both the alignment film of the TFT substrate and the alignment film of the counter substrate include the polyamide acid ester.

8. The liquid crystal display device according to claim 2, wherein both the alignment film of the TFT substrate and the alignment film of the counter substrate include the polyamide acid ester.

9. The liquid crystal display device according to claim 1, wherein the antioxidant prevents oxidation of the liquid crystals.

10. The liquid crystal display device according to claim 1, wherein the antioxidant prevents oxidation of the liquid crystals.

11. The liquid crystal display device according to claim 1, wherein the antioxidant is one selected from the group consisting of phenol, phosphate, phosphite, and sulfur type materials.

12. The liquid crystal display device according to claim 2, wherein the antioxidant is one selected from the group consisting of phenol, phosphate, phosphite, and sulfur type materials.

* * * * *